J. P. HAGAMAN.
DRIVING CONNECTION.
APPLICATION FILED MAR. 1, 1920.
1,380,953.
Patented June 7, 1921.
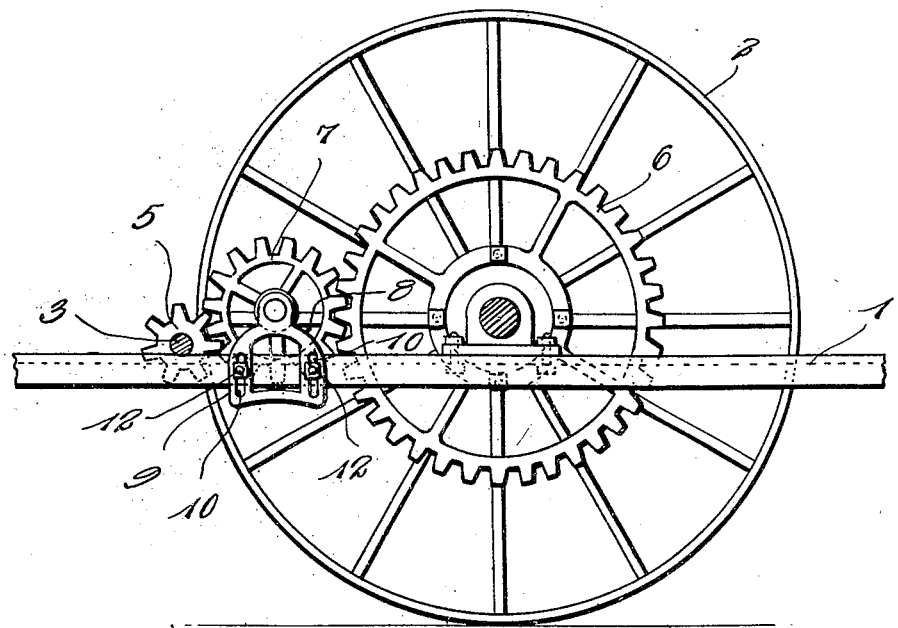
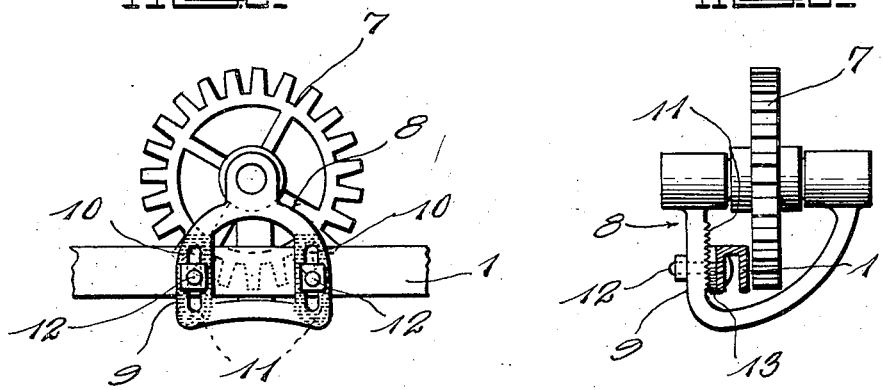
J. P. HAGAMAN
INVENTOR
BY *Victor J. Evans*
ATTORNEY
WITNESSES

UNITED STATES PATENT OFFICE.

JOSEPH P. HAGAMAN, OF LANCASTER, WASHINGTON.

DRIVING CONNECTION.

1,380,953.  Specification of Letters Patent.  Patented June 7, 1921.

Application filed March 1, 1920. Serial No. 362,486.

*To all whom it may concern:*

Be it known that I, JOSEPH P. HAGAMAN, a citizen of the United States, residing at Lancaster, in the county of Whitman and State of Washington, have invented new and useful Improvements in Driving Connections, of which the following is a specification.

In hilly localities because of side strain imposed on the bull wheels of headers and binders, the bull wheels are thrown out of alinement, and the chains of sprocket drive connections are twisted and broken after a short period of use.

The object of my present invention, therefore, is the provision of a driving connection for headers and binders which does not entail the employment of a sprocket belt, is adapted to transmit proper motion to the working parts of a binder or header, and is susceptible of adjustment to take up wear, so that the driving connection may be made to last in good working condition as long as the remainder of the machine.

To the attainment of the foregoing, the invention consists in the improvement as hereinafter described and definitely claimed.

In the accompanying drawings:

Figure 1 is a side elevation of so much of a header or a binder as is necessary to show the application of my improved driving connection.

Figs. 2 and 3 are enlarged detail views illustrative of the manner in which the interposed spur gear is adjustably fixed.

Similar numerals designate corresponding parts in all of the views of the drawings.

The frame 1 may be and preferably is of the well known construction, as are the bull or drive-wheel 2 and the speeding shaft 3.

In accordance with my invention, I employ a spur pinion 5 on the shaft 3, and a spur gear 6 fixed with respect to the wheel 2; the said gear 6 being shown as bolted to the wheel 2, though it manifestly might be integral with the said wheel or fixed thereto in any available manner without affecting my invention. Also according to my invention I interpose an idler spur gear 7 between the pinion 5 and the spur gear 6 and so that it intermeshes with the same. The said idler gear 7 is carried in a bracket 8 of general inverted U-shape which includes an upright side portion 9 having upright slots 10, and also having a corrugated face 11. The slots 10 receive bolts 12 that connect the bracket 8 to the adjacent frame bar 1, and the said corrugated face 11 is opposed to correspondingly corrugated metallic filler blocks 13 which contribute to the security and strength of the adjustable fixing of the idler gear 7 relatively to the gears 5 and 6. The gear 7 is of greater diameter than the space between the gears 5 and 6, and consequently by adjustment of said gear 7, wear may be readily and effectively taken up, it being noticed in this connection that it is entirely feasible to take up wear between the idler 7 and the gear 6 by lowering the portion of the bracket 8 adjacent to the gear 6, and wear between said idler 7 and the spur pinion 5 by lowering the portion of the bracket 8 adjacent to said pinion.

Practical use of my improvement as described has demonstrated that while no more expensive than the ordinary belt drive, the improvement when inclosed to exclude dust and dirt will last in good working condition much longer than the belt drive, and in fact as long as the remainder of a header or a binder.

Having described my invention, what I claim and desire to secure by Letters-Patent, is:

In a driving connection, the combination of a frame portion, a ground drive wheel, a spur gear fixed with respect to said wheel, a speeding shaft bearing a spur pinion alined with and spaced from said gear wheel, an idler spur gear of greater diameter than the width of said space imposed between and intermeshed with the gear and pinion, an inverted U-shaped bracket carrying and containing said idler gear and having a corrugated face and also having upright slots, corrugated filler means, and bolts extending through said slots and the frame portion and adjustably fixing the bracket to said frame portion.

In testimony whereof I affix my signature.

JOSEPH P. HAGAMAN.